United States Patent Office 2,970,128
Patented Jan. 31, 1961

2,970,128
IMPROVED ELASTOMER COMPOSITION CONTAINING ANTIOXIDANTS

Ernest Csendes, Wilmington, Del., assignor to E. I. du Pont de Nemours and Company, Wilmington, Del., a corporation of Delaware No Drawing. Filed Dec. 24, 1958, Ser. No. 782,669

5 Claims. (Cl. 260—41.5)

This invention is directed to an improved elastomer composition protected from degradation caused by heat aging, said composition containing the hereinafter described synergistic antioxidants.

It has long been known that heat aging is deleterious to the physical properties of cured elastomer stock. In particular, there is a sharp loss in tensile strength. Although antioxidants have customarily been incorporated, they have not provided sufficient protection.

It is, therefore, an object of the present invention to provide an improved elastomer composition wherein cured elastomer stock is protected from the deterioration of its physical properties which occurs during heat aging. It is another object to promote the activity of antioxidants which are useful in protecting cured elastomers from degradation during heat aging. It is a further object to provide a non-discoloring synergistic antioxidant combination to protect cured elastomer stock. It is a still further object to facilitate the use of non-discoloring phenolic antioxidants in elastomer stock.

These and other objects will become apparent in the following description and claims.

More specifically, the present invention is directed to a cured elastomer having incorporated therein a stabilizing amount of the following synergistic combination: (A) a phenolic antioxidant; (B) an N-alkyl glucamine; and, (C) an inorganic filler selected from the group consisting of calcium carbonate, barium sulfate, titanium dioxide, and, clay.

More particularly, this invention concerns an elastomer composition having improved stability toward heat aging, which composition comprises: 100 parts by weight of a cured elastomer; 0.1 to 5 parts by weight of a phenolic antioxidant; 0.1 to 5 parts by weight of an N-alkyl glucamine, and, from 50 to 100 parts by weight of an inorganic filler selected from the group consisting of: calcium carbonate, barium sulfate, titanium dioxide, and, clay, there being present, as a matter of preference, for every part by weight of said phenolic antioxidant, at least 0.25 part by weight of said N-alkyl glucamine.

In order to prepare the present novel composition, it is necessary to compound uncured elastomer stock in the usual manner with stearic acid, sulfur, conventional vulcanization accelerators, and the components of the described synergistic combination. The compounded stock is then cured by heating in the conventional manner of the trade.

The elastomer employed in the subject invention may be either natural rubber or synthetic rubber made from conjugated dienes. Representative examples of the latter are: polyisoprene having an essentially all-cis configuration, butadiene-styrene copolymer (known as SBR rubber), polychloroprene, butadiene-2,3-dimethyl butadiene copolymer, poly 2,3-dimethyl butadiene (known as methyl rubber), poly 2-chloro-3-methyl-butadiene-1,3, butadiene-dichlorostyrene copolymer, butadiene-monochlorostyrene copolymer, butadiene-alpha-methylstyrene copolymer, butadiene-p-methoxystyrene copolymer, butadiene-dimethylstyrene copolymer, butadiene-dimethoxystyrene copolymer, butadiene-alpha-methyl-p-methylstyrene copolymer, butadiene-p-phenyl styrene copolymer, isoprene-styrene copolymer, isoprene-butadiene copolymer, 2-isopropyl butadiene-styrene copolymer, 2-ethyl butadiene-styrene copolymer, 2-n-amyl-butadiene-styrene copolymer, polybutadiene, poly 2-ethyl butadiene, poly 2-isopropyl butadiene, poly 2-n-amyl butadiene, polycis-piperylene, butadiene-1-cyanobutadiene copolymer, isoprene-chloroprene copolymer, poly 2-fluorobutadiene, and butadiene-2-methyl-4-methoxy-5-isopropyl styrene copolymer. Butadiene-acrylonitrile copolymer (known as Perbunan), butadiene-methylisopropenyl ketone copolymer, and chloroprene-methylisopropenyl ketone copolymer are representative examples of other elastomers which may be used.

The synergistic combination of this invention consists of three components: phenolic antioxidants, certain N-alkyl glucamines, and certain inorganic fillers. The antioxidants alone provide cured elastomer stock with only a limited measure of protection against heat aging; neither the operable glucamines nor the operable inorganic fillers protect cured elastomer gum stock at all. Furthermore, the N-alkyl glucamines do not promote the activity of the antioxidants in cured elastomer gum stock. It was, therefore, entirely unexpected that a combination of these three reagents would provide an exceptionally enhanced measure of protection against, for example, heat aging and resulting discoloration.

The reasons for this synergistic activity are not understood. It is not possible to predict what N-alkyl glucamine compounds or what fillers will be operable. Although some fillers such as calcium carbonate, titanium dioxide, clay, and barium sulfate behave synergistically with the phenolic antioxidants and the described glucamines, other fillers such as silica, carbon black, and magnesium carbonate are inoperable, and, barium carbonate can only be used at low concentrations.

It is believed that any phenolic antioxidant may be used in this invention. By phenolic antioxidant is meant a phenolic compound, which, when added to an elastomer in small proportions, retards atmospheric oxidation or the effect of oxidation. It is to be understood that the activity of some antioxidants may be promoted more effectively than that of other antioxidants by the combined presence of the selected glucamines and the selected fillers.

Representative examples of antioxidants which may be employed are: 2,2'-methylenebis(6-tert-butyl-4-methyl phenol), 2,2'-methylenebis(6-tert-butyl-4-ethyl phenol), 2,2' - methylenebis[4 - methyl - 6 - (1,1,3,3 - tetramethyl) butyl phenol], 4,4'-bis(2-tert-butyl-5-methyl phenol)sulfide, 4,4'-butylidine-bis(2-tert-butyl-5-methyl phenol), 2,2'-methylenebis (4,6-dimethyl phenol), 2-tert-butyl-4 (4-tert-butyl-phenyl)phenol, 2-tert-butyl-4-phenyl phenol, 2,6-dibenzyl-4-methyl phenol, 2-benzyl-4-methyl phenol, 2-benzyl-6-tert-butyl-4-methyl phenol, 2-benzyl-6-tert-butyl-4-ethyl phenol, 2,4-dimethyl-6-(1-methyl-1-cyclohexyl) phenol, 2,6-diisopropyl-4-methyl phenol, 2,4-dimethyl-6-isopropyl phenol, 2-tert-butyl-4,6-dimethyl phenol, 2-tert-butyl-4-methyl phenol, 2-(1,1,3,3-tetramethyl butyl)-4-methyl phenol, 2,4,6-trimethyl phenol, 2,6-di-tert-butyl-4-methyl phenol, 2,6-di-tert-butyl-4-ethyl phenol, 4-phenyl phenol, 2,6-diisopropyl phenol, 2,6-di-tert-butyl-4-phenyl phenol, 2,6-di-tert-butyl-4-(4-tert-butyl-phenyl)phenol, 2,5-di-tert-butyl-hydroquinone, 2,5-di-tert-amyl-hydroquinone, and alpha-conidendrine. Mixtures of the foregoing may be used.

There appears to be no criticality in the ratio of the glucamine compound to the antioxidant; however, better results are obtained when at least about 0.25 part of glucamine is present for each part by weight of the antioxidant; it is preferred to use about equal weights of both. In practice, their individual concentrations may range from about 0.1 to 5% by weight of the elastomer. Less satisfactory protection is gained when lower concentrations are used; higher concentrations are less economically attractive. The preferred concentration range is about 0.5–1.5% by weight of the elastomer.

There appears to be no criticality in the value of the weight ratio of the filler to either of the other members of the synergistic combination. The best results for calcium carbonate, titanium dioxide, clay, and barium sulfate are obtained when about 50 to 100 parts are used for every 100 parts by weight of the elastomer. Improvement is noted even at levels as low as 5 parts of filler by weight. Barium carbonate, on the other hand, appears to affect the stabilization adversely when used at the 50 part level; however, it provides some improvement at the 5 part level; particularly in admixture with a combination comprising 5 parts of titanium dioxide and 50 parts of clay.

The compounded elastomer stock may be sulfur cured by techniques well known in the art. In general, about two parts of sulfur per 100 parts of elastomer is necessary to effect the cure in the presence of appropriate accelerators. Uncured white rubber stock may be easily compounded with the described synergistic combination without increased scorchiness. Vulcanization is accomplished by heating the compounded stock (usually in a mold) at a temperature of about 100 to 180° C. for a period ranging from about 1 half hour to several hours. It is to be understood that various modifications of this sulfur curing may be employed depending upon the stock. Various procedures and modifications of sulfur curing are more particularly described in Encyclopedia of Chemical Technology, Kirk and Orthmer, published by Inter-Science Encyclopedia Inc., New York, 1953, volume 11, pages 892–927; Principles of High-Polymer Theory and Practice, Schmidt and Marlies, published by McGraw-Hill Book Co., New York, 1948, pages 556–566; and Industry and Technology of Rubber, Davis and Blake, published by Rheinhold Publishing Corp., New York, 1937, volume 74, chapter 6.

Representative examples illustrating the present invention are as follows.

EXAMPLES

Masterbatch A

Masterbatch A is prepared by compounding 100 parts of pale crepe rubber with the following ingredients: 5 parts of zinc oxide, 13 parts of titanium dioxide, 67 parts of calcium carbonate (whiting), 1 part of stearic acid, 1 part of 2,2'-dithiobisbenzothiazole, 0.1 part of 2-mercaptobenzothiazole, and 2 parts of sulfur.

EXAMPLE 1

(A) Masterbatch A is further compounded as shown in Table I–A below to give stocks IA–IG which are cured at 142° C. for 30 minutes. The vulcanizates obtained are heat aged in air at 121° C. for 16 and 24 hours. The effect of heat aging on these vulcanizates is shown by the data given in Table I–A below.

TABLE I-A

| Stock | Additives | | | Protection of Vulcanizate | | |
|---|---|---|---|---|---|---|
| | Antioxidant,[1] Conc'n.[2] | Promoter, Type | Promoter, Conc'n.[2] | Initial $T_B$ (p.s.i.) | Percent Retention of $T_B$ After— | |
| | | | | | 16 hrs. at 121° C. | 24 hrs. at 121° C. |
| I-A | 1 | None | 0 | 2,300 | 63 | 44 |
| I-B | 0 | Di(Morpholinium) Citrate | 4 | 2,300 | 33 | 13 |
| I-C | 1 | do | 4 | 2,450 | 74 | 52 |
| I-D | 0 | Di(N-methylglucaminium) Citrate | 4 | 2,450 | 53 | 41 |
| I-E | 1 | do | 4 | 2,350 | 100 | 75 |
| I-F | 0 | Di(Monoethanolammonium) Citrate | 4 | 3,150 | 41 | 30 |
| I-G | 1 | do | 4 | 3,100 | 58 | 45 |

[1] 2,2'-methylenebis(6-tert-butyl-4-methyl phenol).
[2] Parts additive/100 parts rubber.

The N-alkyl glucamines of the present invention are entirely superior to the representative amines which are tested here. The citrate of morpholine is only a fourth as effective as that of N-methyl glucamine; the citrate of ethanolamine is inoperable. The activity of N-methyl glucamine is believed to result from its polyhydroxy functionality and not its N-alkyl amino group.

(B) Masterbatch A is further compounded as shown in Table I–B below to give stocks I-H to I-K which are cured at 142° C. for 30 minutes. The vulcanizates obtained are heat aged at 121° C. for 16 and 21 hours. Table I–B below, which shows the effect of heat aging on the vulcanizates, further demonstrates the superiority of the N-alkyl glucamines to representative aliphatic amines in promoting the activity of phenolic antioxidants.

TABLE I-B

| Stock | Additives | | | Protection of Vulcanizate | | |
|---|---|---|---|---|---|---|
| | Antioxidant,[1] Conc'n.[2] | Promoter, Type | Promoter, Conc'n.[2] | Initial $T_B$ (p.s.i.) | Percent Retention of $T_B$ After— | |
| | | | | | 16 hrs. at 121° C. | 24 hrs. at 121° C. |
| I-H | 1.0 | | 0.0 | 2,550 | 55 | 22 |
| I-I | 1.0 | Dicyclohexylammonium citrate | 1.0 | 2,650 | 66 | 38 |
| I-J | 1.0 | Triethylammonium citrate | 1.0 | 3,100 | 60 | 37 |
| I-K | 1.0 | Bis(N-methylglucaminium) citrate | 1.0 | 3,200 | 63 | 55 |

[1] 2,2'-methylenebis(6-tert-butyl-4-methylphenol).
[2] Parts additive/100 parts rubber.

EXAMPLE 2

(A) 19 lots of Masterbatch A are prepared. Each lot is further compounded as described below in Table 2 to give stocks 2–A to 2–S.

(B) Stocks 2–A to 2–S are heated for 30 minutes at 142° C. The vulcanizates obtained are heat aged in air in a tube at 121° C. for 8, 16 and 24 hours. Table 2 below shows the effect of this heat aging on the tensile strength of each sample.

TABLE 2

| Stock | Additives | | N-Methyl-glucamine citrate H₂O (parts) | Protection of Vulcanizate | | | |
|---|---|---|---|---|---|---|---|
| | Antioxidant | | | Initial $T_B$ (p.s.i.) | Percent Retention of $T_B$ After Heat Aging at 121° C. for— | | |
| | (type) | (parts) | | | 8 hrs. | 16 hrs. | 24 hrs. |
| A | 2,2'-methylenebis(6-tert-butyl-p-cresol) | 1 | 0 | 2,950 | 48 | 17 | 5 |
| B | do | 1 | 1 | 2,800 | 72 | 52 | 41 |
| C | do | 1 | 0 | 2,950 | 80 | 64 | 56 |
| D | tri-tert-butyl-p-phenylphenol | 1 | 1 | 2,750 | 45 | 13 | 9 |
| E | do | 1 | 0 | 2,830 | 67 | 49 | 36 |
| F | bis(4-hydroxyphenyl)dimethylmethane | 1 | 1 | 2,950 | 41 | 14 | 8 |
| G | do | 1 | 0 | 3,020 | 48 | 30 | 17 |
| H | p-phenylphenol | 1 | 1 | 2,930 | 45 | 15 | 5 |
| I | do | 1 | 0 | 2,900 | 59 | 36 | 21 |
| J | 2-benzyl-6-tert-butyl-4-methyl phenol | 1 | 1 | 2,600 | 63 | 44 | 22 |
| K | do | 1 | 0 | 3,100 | 74 | 63 | 55 |
| L | (Wingstay T)¹ | 1 | 1 | 3,100 | 45 | 13 | 13 |
| M | do¹ | 1 | 0 | 3,300 | 61 | 49 | 33 |
| N | 2,6-di-tert-butyl-4-methyl phenol | 1 | 1 | 3,200 | 23 | 8 | 6 |
| O | do | 1 | 0 | 2,800 | 79 | 61 | 36 |

¹ Mixture of tert-butyl and tert-octyl substituted m- and p-cresols.

EXAMPLE 3

5 lots of Masterbatch A are compounded as described below in Table 3 to give stocks 3–A to 3–D which are cured at 142° C. for 30 minutes. The vulcanizates obtained are heat aged in air in a tube at 121° C. for 16 and 24 hours. Table 3 below shows the effect of the heat aging on the vulcanizate properties.

TABLE 3

| Stock | Additive | Conc'n.¹ | Protection of Vulcanizate | | |
|---|---|---|---|---|---|
| | | | Original $T_B$ | Percent Retention of $T_B$ After Heat Aging at 121° C. for— | |
| | | | | 16 hrs. | 24 hrs. |
| 3-A | Antioxidant ² | 1.0 | 3,200 | 63 | 48 |
| 3-B | Antioxidant ² | 1.0 | 3,350 | 69 | 63 |
| | bis (N-methyl-glucammonium) citrate | 1.0 | | | |
| 3-C | Antioxidant ² | 1.0 | 3,150 | 73 | 67 |
| | N-methyl glucamine | 1.0 | | | |
| 3-D | Antioxidant ² | 1.0 | 3,050 | 55 | 40 |
| | Citric acid | 4.0 | | | |

¹ Parts/100 parts of crepe.
² 2,2'-methylenebis(6-tert-butyl-4-methylphenol).

EXAMPLE 4

Three lots of Masterbatch A are compounded as described below in Table 4 to give stocks 4–A to 4–C which are cured and heat aged by the procedure of Example 3. Table 4 below contains the tensile strength data obtained during this test.

TABLE 4

| Stock | Additive | Conc's.¹ | Protection of Vulcanizate | | |
|---|---|---|---|---|---|
| | | | Initial $T_B$ | Percent Retention of $T_B$ After— | |
| | | | | 16 hrs. | 24 hrs. |
| 4-A | Antioxidant ² | 1.0 | 3,100 | 65 | 44 |
| 4-B | Antioxidant ² | 1.0 | 3,250 | 68 | 60 |
| | N-methylglucamine | 1.0 | | | |
| 4-C | Antioxidant ² | 1.0 | 3,100 | 81 | 60 |
| | N-Laurylglucamine | 1.0 | | | |

¹ Parts additive/100 parts of rubber
² 2,2'-methylenebis(6-tert-butyl-4-methylphenol).

Any of the elastomers set forth in this specification may be substituted in any one of the preceding Examples 1–4 to obtain substantially the same results as those achieved with rubber.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A cured elastomer selected from the group consisting of natural rubber and synthetic rubber made from conjugated dienes having incorporated therein, per 100 parts by weight of said elastomer, (a) from 0.1 to 5 parts by weight of a phenolic antioxidant, (b) from 0.1 to 5 parts by weight of an N-alkyl glucamine, said N-alkyl substituent having from 1 to 12 carbon atoms, and (c) from 50 to 100 parts by weight of an inorganic filler selected from the group consisting of calcium carbonate, barium sulfate, titanium dioxide and clay.

2. A cured elastomer according to claim 1 wherein the N-alkyl glucamine is N-methyl glucamine.

3. A cured elastomer according to claim 1 wherein the N-alkyl glucamine is N-lauryl glucamine.

4. A cured elastomer according to claim 1 wherein the phenolic antioxidant is present in an amount from 0.5 to 1.5% by weight of said elastomer.

5. A cured elastomer according to claim 1 wherein the N-alkyl glucamine is present in an amount from 0.5 to 1.5% by weight of said elastomer.

References Cited in the file of this patent

UNITED STATES PATENTS 2,819,329  Sullivan ---------------- Jan. 7, 1958